(12) United States Patent
Pragada et al.

(10) Patent No.: US 9,031,950 B1
(45) Date of Patent: May 12, 2015

(54) METHOD AND APPARATUS FOR PROVIDING A SET OF ANSWERS FROM AN ORDERED OR UNORDERED SET OF POSSIBLE ANSWERS

(75) Inventors: Sreenivasa Rao Pragada, Irvington, NY (US); Abhijit Ashok Patil, Alpharetta, GA (US); Raju Venkatta Rama Raju Gopala Gottumukkala, Dunwoody, GA (US); Viswanath Dasari, Alpharetta, GA (US); Kaliki Murthy Aritakula, Cumming, GA (US)

(73) Assignee: Semantifi, Inc., Stamford, CT (US)

( * ) Notice: Subject to any disclaimer, the term of this patent is extended or adjusted under 35 U.S.C. 154(b) by 38 days.

(21) Appl. No.: 13/163,709

(22) Filed: Jun. 19, 2011

Related U.S. Application Data

(60) Provisional application No. 61/374,632, filed on Aug. 18, 2010.

(51) Int. Cl.
*G06F 17/30* (2006.01)

(52) U.S. Cl.
CPC .............................. *G06F 17/30705* (2013.01)

(58) Field of Classification Search
CPC .................................................. G06F 17/30705
USPC .................................................. 707/737–740
See application file for complete search history.

(56) References Cited

U.S. PATENT DOCUMENTS

| | | | | |
|---|---|---|---|---|
| 2007/0112747 A1* | 5/2007 | Haigh et al. | | 707/4 |
| 2007/0136236 A1* | 6/2007 | Kussmaul et al. | | 707/2 |
| 2008/0082531 A1* | 4/2008 | Suarez | | 707/7 |

* cited by examiner

*Primary Examiner* — Thu-Nguyent Le
(74) *Attorney, Agent, or Firm* — Gordon Kessler

(57) ABSTRACT

A method and apparatus for finding a set of good enough answers from a set of possible answers. The method includes the steps of defining a set of possible answers, grouping individual answers from the set of possible answers with similar answers, determining whether a first of the groupings of individual answers is distinctly different from the next of the groupings of individual answers, and defining the first of the groupings of the individual answers as a set of good enough answers if it is determined to be distinctly different from the next of the groupings.

23 Claims, 1 Drawing Sheet

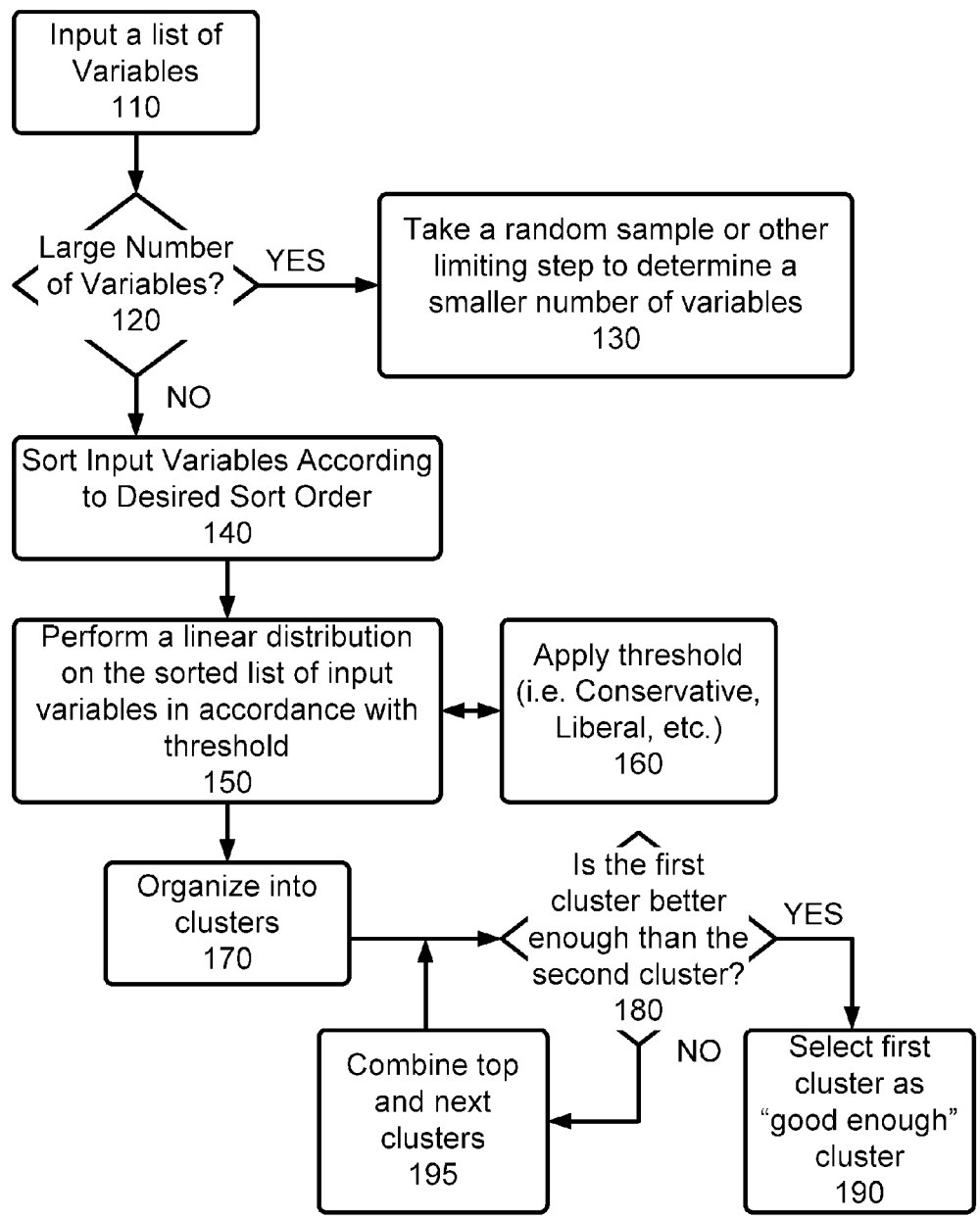

METHOD AND APPARATUS FOR PROVIDING A SET OF ANSWERS FROM AN ORDERED OR UNORDERED SET OF POSSIBLE ANSWERS

CROSS REFERENCE TO RELATED APPLICATIONS

This application claims the benefit of U.S. Provisional Patent Application Ser. No. 61/374,632, titled "Universal Satisficing Mechanism", filed Aug. 18, 2010 to Pragada et al., the entire contents thereof being incorporated herein by reference.

FIELD OF THE INVENTION

Embodiments of this invention relate generally to ranking of search results and more particularly to a method and apparatus for determining a set of answers from an ordered or unordered set of possible answers that are considered to be "good enough" to answer one or more queries.

BACKGROUND OF THE INVENTION

One of the major capabilities of humans over machines is the ability to work with less than perfect information. Machines can process exact inputs and deliver exact answers—the exception is often due to a defect which may not the intent or design. This capability is also referred to as satisficing, a "handy blended word combining satisfy with suffice", is a decision-making strategy that attempts to meet criteria for adequacy, rather than to identify an optimal solution—in short, satisficing is to identify a "good enough" solution.

Machines can be built to optimize using probabilities of outcomes, evaluating outcomes with sufficient precision, storing and retrieving even very large sets of outcomes and crunching them rapidly with sophisticated computing techniques. Humans lack many of these capabilities and yet excel at finding a good-enough answer to most decisions almost instinctively or instantaneously. Many agree that satisficing skill is applied in almost all human actions or decisions. Put a tennis ball into someone's hand and ask how much it weighs. The answer could be instantaneous as 4 ounces or 5 ounces or some other guess. The focus in not on an exact answer or an optimal answer. The focus is on a good-enough answer with a good-enough precision.

In the simple decision discussed above, at least two references are made to the application of satisficing. Humans make many thousands of decisions on an average day such as how much force to apply to lift something, how hard to throw a ball over the fence, what's the temperature now, etc. Based on this ubiquity of the application of satisficing capability, many agree that this capability cannot be an optimization machine, must be driven by simple math, must be evaluated with minimal computing needs, cannot burden the actual process of decision making, must be scalable in that it must have similar response times irrespective of number of ordered elements, must be universally applicable whether it find a good-enough height, good-enough precision, good-enough market capital of a company, etc.

This capability remains one of the most critical gaps or challenges in any machine application that tries to emulate any of the human capabilities. The applications cover a broad spectrum such as speech recognition, image recognition, optical character recognition, smell sensors, pressure sensors, gesture recognition, digital content recognition, language processing, semantic search, motion detection, sound detectors, etc.

SUMMARY OF THE INVENTION

In accordance with various embodiments of the invention, a method and apparatus are provided for determining and providing a set of answers that are determined to be "good enough" to answer a posed query.

At the core of this task of finding a good enough solution is a critical capability or a mechanism to choose a set of good enough answer(s) from a set of possible answers and make a good-enough decision based on the chosen set. The actual or absolute values of the possible answers do not matter. Rather, how distinctly different the best set of values are from the next best set of values is what is important in accordance with various embodiments of the invention. For instance, consider a set of confidence values with a goal to find a set of good-enough confidence value(s). A sub-set of confidence values may only suggest a 20% confidence in the accuracy of the result, but this group may be distinctly better than any of the other confidence values. Therefore, this group of values may be provided as a set of good enough confidence value(s). On the contrary, another set of confidence values could present a confidence of as high as a 99% confidence in the accuracy of the result, but if this group of confidence values is not distinctly different the other confidence values in the universe of sampled confidence values, this group may not be definable as a set of good-enough confidence levels. This is because in the later example there is no ability to sufficiently differentiate the group from the remaining values, while in the former example, such a distinction may be made.

Examples of applicability of the inventive technology include determining a good enough set of search results from millions of possible search results based upon relevance values. One may also select a machine recognition item from among a large number of possible recognized items. Finally, one may use the inventive method and system in accordance with a selection of any subset from any large number of possible responses, where the possible responses are ordered in some meaningful manner. Thus, one can be provided with a set of answers that are distinctly different/better from the other of the possible responses.

In addition, to being able to determine whether a subset of a group of ordered or unordered values, samples, etc. comprise a "good enough' response, it is important that this determination be made with similar predictable response times irrespective of number of elements in the group of values. In general, sorting or ordering a larger set of elements will take a longer time than similarly sorting or ordering a smaller set of elements, thereby potentially affecting the scalability of any such ordering application. In accordance with embodiments of the present invention, this challenge may be easily addressed by applying heuristics, thresholds, or random sampling to choose the potential elements prior to any desired ordering so that the task of ordering does not burden response times.

An example of such an application may include a query such as "who has the cutest dog in the world?" In theory, a machine without the sense of "good enough" might attempt to estimate the level of cuteness of every dog in the world, order the list and then find the good-enough answers from that input set. A machine with the good-enough sense may apply either a threshold, heuristic or sampling as needed. In this instance, a heuristic such as limiting the "world of dogs" to the 50 or so dogs you know may be employed to addresses the challenge.

As an another example, a search engine such as Google® may apply a threshold of 40,000 to the set of millions of potential results matching a search query (from the page rank publication) before applying its PageRank mechanism. Once this smaller set of items is determined, they can be more easily ordered and then ranked in accordance with alternative embodiments of the present invention.

Various embodiments of the invention describe a mechanism which takes an input of an ordered set of answers (or unordered in a manner as described above) to identify good-enough answer(s). The mechanism is preferably universally applicable as the input to the embodiments of the invention is simply a set of numbers. It does not matter whether these numbers represent weights, heights, volumes, precisions, densities, etc.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 1 is a flowchart diagram depicting the steps for determining a "good enough" set of answers in accordance with an embodiment of the invention.

DETAILED DESCRIPTION OF THE PREFERRED EMBODIMENTS

Various embodiments of the present invention will now be described, making reference to the figures. The inventive solution, as described in accordance with one or more embodiments of the present invention, may comprise an algorithm that accepts a set of real numbers. It does not impact the mechanism that these numbers could be representing levels of confidence, weights, heights, light years, etc. They simply represent possible answers. Embodiments of the present invention may then be employed to identify a subset of these possible answers that comprise a set of good-enough answer(s), also referred to as a top cluster in this application.

The first step is to sort a set of possible answers in a desirable direction either ascending, descending, or other ordered sequence. Based on the selected ordering sequence, a result is either a top-cluster or a bottom-cluster solution. The algorithm may also accept another input to determine what kind of tolerance, for example Liberal or Conservative clustering. A Liberal clustering is recommended if it is desired to see more values in the "good enough" cluster. A Conservative clustering may be employed if it desired to have a truly exclusive set of items in the "good enough" cluster. Such a selection is therefore indicative as to how selective the system should be in either including or excluding items from the top, "good enough" cluster.

Inputs and outputs in accordance with embodiments of the invention fundamentally and preferably may comprise a set of numbers representative of some related values, perhaps representing test scores, points, or any other representation.

The result of application of the invention will determine which group of the set of numbers is different enough from the other of the items in the group to comprise a good enough set of items and can therefore be provided as an appropriate response to a particular query. A sample set of inputs in accordance with the invention may comprise the following:

Sample input: {1.0, 2.0, 3.0, 60.0, 90.0, 91.0}

Clusters may be formed of values that are similar to each other and different from other of the groups of items.

Clustered Output: {1.0,2.0,3.0}, {60}, {90.0,91.0}

Finally, the top cluster (cluster including items giving a best response to a particular query) is determined to be substantially better than a next best group to be determined as a good enough answer. If it were not determined to be substantially better, perhaps the top two groups of items may be combined into a new top group of items.

Top cluster: {90,91}

As is set forth in FIG. 1, at step 110 a number of variables are input into the system, and at step 120 it is inquired whether that set of variables is too large. This determination is made in comparison to computing capabilities, etc., and in particular, a group may be determined to be "too large" if ordering the set of variables may take longer than a desired latency period. If it is determined at step 120 that in fact the group of input variables is too large, then at step 130, a smaller number of variables is selected by taking a random sample, employment of one or more threshold determination of a number of statistically or otherwise acceptable number of variables, or employment of a "good enough" system to determine whether there are enough "good enough" variables to use in the system. Once an appropriate number of variables are selected, or if at step 120 it was determined that there are not too many variables, processing passes to step 140.

At step 140, the remaining variables are sorted according to a predetermined sort order, preferably in a descending or ascending order, but any other desirable order may be employed.

Sort the subset list of N numbers in ascending or descending order $\{v(1), v(2), v(3), \ldots v(N)\}$ where $v(i)$ represents the variable at the index value of i Then at step 150 a linear distribution of the ordered variables is applied, according to a desired threshold (set forth at step 160).

Accept another input for the value of CV_THRESHOLD {Conservative_CV_VALUE, LIBERAL_CV_VALUE}

As noted above, this threshold is preferably indicative of a level of strictness necessary for an item to be included in a particular (e.g. the top) cluster. Then, at step 170 the items are divided into clusters, Create N clusters with one value $C(1)=\{v(1)\}, C(2)=\{v(2)\}, C(3)=\{v(3)\}, \ldots, C(N)=\{v(N)\}$ and at step 180 it is determined whether the top cluster is different enough (better enough) than the next cluster. If yes, then the top cluster is provided as a "good enough" response to a query at step 190. If the top cluster is not different enough, then the top and next cluster are combined at step 195, and processing returns to the inquiry at step 180.

Starting the last cluster, check two adjacent clusters to see if they can be merged together to form one single cluster. If the numbers are closely spaced then they are a good candidate for combining. They can be computed if their co-efficient of variation (CV value) is under the desirable threshold(CV_Threshold).

Start with Index i=N
If the value of i=1
Then
   return C(1) as the top cluster
For each pair of C(i−1), C(i) where value of i >1
Compute mean-M1 and mean-M2 for the selected pair of clusters.
   M1=mean (C(N−1))
   M2=mean(C(N−2))
Using values of M1 and M2 compute the co-efficient of variation CV
   M3=mean(M1, M2)
   SD=standard deviation(M1,M2)
   CV=SD/M3
If CV<CV_THRESHOLD,
Then
   merge clusters C(i) into C(i−1)
   decrement the value of i by 1
   GO TO step b) above
Else
Return C(i) as the top cluster The following table shows a number of possible sets of input variables, and what the top cluster might be based upon one of two possible thresholds.

TABLE 1

(Results):

| Input Set | Top Cluster (Conservative) | Top Cluster (Liberal) |
|---|---|---|
| 1 {14.385, 14.385, 16.6375, 16.6375} | {16.6375, 16.6375} | {14.385, 14.385, 16.6375, 16.6375} |
| 2 {1.0, 1.1} | {1.1} | {1.0, 1.1} |
| 3 {50, 50, 25, 20, 33, 65, 34, 33, 33, 34, 34, 20, 34, 33, 50, 70, 33, 20} | {70} | {70, 65, 50, 50, 50} |
| 4 {45, 90} | {90} | {90} |
| 5 {95, 97} | {97,95} | {97, 95} |
| 6 {15, 15, 17} | {17} | {15, 15, 17} |
| 7 {1, 2, 3, 4, 5, 6, 7, 8, 9, 10} | {10} | {10, 9, 8, 7, 6} |
| 8 {20, 30, 40, 1000, 1100, 1200} | {1200} | {1200, 1100, 1000} |
| 9 {15, 25, 35} | {35} | {35, 25} |
| 10 {8, 10, 12, 34, 35} | {35, 34} | {35, 34} |
| 11 {60, 60, 60, 60, 90, 90, 100, 100} | {100, 100} | {100, 100, 90, 90} |

As noted above, application of the present invention to a large group of elements may preferably employ a method or system for reducing the number of elements to which the system is applied, preferably maintaining an amount of searching or processing time necessary. Therefore, in accordance with various embodiments of the invention, an algorithm for finding a good enough set of elements—in the case of a large set of unordered elements—may employ the following additional steps.

1. if the set is a randomly distributed then take a random sample
2. if the set is not a randomly distributed set, then limit the set by thresholds or heuristics determined at a domain, application, context and/or computational capability of the specific task Embodiments of the present invention may be employed on various appropriate computer systems, providing sufficient computing power and storage means. Access to such computing system may be provided to one or more users in any manner, such as via a web portal, direct connection, or other access.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A non-transitory computer readable storage medium having a computer program stored thereon, the computer program causing a computer to perform the steps of:
(a) determining a set of possible elements;
(b) ordering the set of possible elements according to one or more attributes, each of the ordered elements making up a group;
(c) determining a first covariance only between a first of the groups and a second of the groups;
(d) determining that the first group is a good enough subset of the ordered set of possible elements if the first covariance is greater than the predetermined threshold;
(e) combining the first of the groups and the second of the groups to form a new first group of elements from the ordered set of possible elements if the first covariance is determined to be less than a predetermined threshold;
(f) determining a second covariance between the new first group of elements and a next group of the ordered set of possible elements;
(g) determining that the new first group is a good enough subset of the ordered set of possible elements if the second covariance is greater than the predetermined threshold;
(h) combining the new first of the groups and the second of the groups to form a new first group of elements from the ordered set of possible elements if the second covariance is determined to be less than a predetermined threshold; and
repeating steps (f)-(h) until the top group of elements is determined to be a good enough subset of the ordered set of possible elements.

2. The non-transitory computer readable storage medium of claim 1, wherein the predetermined threshold is selected by a user.

3. The non-transitory computer readable storage medium of claim 2, wherein the user selects the predetermined threshold by selecting between a plurality of confidence levels.

4. The non-transitory computer readable storage medium of claim 1, further comprising the steps of:
receiving a query from a user; and
determining the set of possible elements in response to the query.

5. The non-transitory computer readable storage medium of claim 4, wherein the set of possible elements is determined in accordance with a search engine.

6. The non-transitory computer readable storage medium of claim 1, wherein the set of possible elements is determined in accordance with a recognition task.

7. The non-transitory computer readable storage medium of claim 1, wherein the first covariance between the first and second of the groups of elements and the second covariance between the new first group and the second group of elements are determined at least in part by comparing the first and second groups and the new first group and the next group to a user query.

8. A non-transitory computer readable storage medium having a computer program stored thereon, the computer program causing a computer to perform the steps of:

determining a set of possible elements from the group of elements;

ordering the set of possible elements according to one or more attributes, each of the ordered elements making up a group;

determining a covariance only between a first of the groups and a second of the groups;

combining the first of the groups and the second of the groups to form a new first group of elements from the ordered set of possible elements if the covariance is determined to be less than a predetermined threshold; and determining that the first group is a good enough subset of the ordered set of possible elements if the covariance is greater than the predetermined threshold.

9. The non-transitory computer readable storage medium of claim 8, wherein if the first and second groups are combined, repeating the step of determining a first covariance between a first of the groups and a second of the groups.

10. The non-transitory computer readable storage medium of claim 8, wherein the set of possible elements from the group of elements is determined by random sampling of the group of elements.

11. The non-transitory computer readable storage medium of claim 8, wherein the set of possible elements from the group of elements is determined by application of one or more heuristics.

12. The non-transitory computer readable storage medium of claim 8, wherein the set of possible elements from the group of elements is determined in response to a query and the covariance is determined at least in part in accordance with comparison of the first of the groups and the second of the groups to the query.

13. A non-transitory computer readable storage medium having a computer program stored thereon, the computer program causing a computer to perform the steps of:

defining a set of possible answers in response to a user query;

ordering the set of possible answers according to one or more attributes related to an ability to answer the user query, each of the ordered answers making up a grouping;

determining only whether a first of the groupings of individual answers is different from the next of the groupings of individual answers in accordance with a coefficient of variation between the first of the groupings and the next of the groupings in accordance with the one or more attributes related to the ability to answer the user query; and defining the first of the groupings of the individual answers as a set of good enough answers if it is determined to be distinctly different from the next of the groupings in accordance with whether the coefficient of variance is greater than a predetermined threshold.

14. The non-transitory computer readable storage medium of claim 13, wherein the set of possible answers is an ordered set.

15. The non-transitory computer readable storage medium of claim 13, further comprising the step of ordering the set of possible answers.

16. The non-transitory computer readable storage medium of claim 15, wherein if the set of possible answers includes more than a predetermined number of elements, selecting a subset of the set of possible answers before ordering.

17. The non-transitory computer readable storage medium of claim 13, wherein the first of the groupings of individual answers are provided as the set of good enough answers in a substantially similar time frame irrespective of the number of possible answers.

18. The non-transitory computer readable storage medium of claim 13, wherein the first of the groupings of the individual answers comprises a group of a highest ordered set of possible answers.

19. The non-transitory computer readable storage medium of claim 13, wherein the first of the groupings of the individual answers comprises a group of a lowest ordered set of possible answers.

20. The non-transitory computer readable storage medium of claim 13, wherein the actual individual answers may take on any arbitrary values.

21. The non-transitory computer readable storage medium of claim 13, wherein the individual answers comprise possible search query responses.

22. The non-transitory computer readable storage medium of claim 13, wherein the individual answers comprise machine recognition identifications.

23. The non-transitory computer readable storage medium of claim 13, wherein the individual answers comprise machine intelligence responses.

* * * * *